United States Patent [19]
Herman

[11] Patent Number: 5,698,821
[45] Date of Patent: Dec. 16, 1997

[54] CABLE ASSEMBLY

[75] Inventor: Steven Charles Herman, Poway, Calif.

[73] Assignee: NCR Corporation, Dayton, Ohio

[21] Appl. No.: 580,025

[22] Filed: Dec. 20, 1995

[51] Int. Cl.$^6$ .................. H02G 15/06; H02G 15/076
[52] U.S. Cl. ...................... 174/72 R; 174/72 A
[58] Field of Search ...................... 174/117 R, 117 F, 174/71 R, 72 A, 72 R; 439/98, 502, 505, 497, 607, 610

[56] References Cited

U.S. PATENT DOCUMENTS

| | | | |
|---|---|---|---|
| 3,568,131 | 3/1971 | Kennedy | 339/45 X |
| 4,113,335 | 9/1978 | Lang et al. | 339/29 R X |
| 4,721,483 | 1/1988 | Dickie | 439/610 |
| 4,822,286 | 4/1989 | Bianca | 439/610 |
| 5,099,137 | 3/1992 | Lattin, Jr. | 307/147 |
| 5,233,692 | 8/1993 | Gajjar et al. | 395/325 |
| 5,299,944 | 4/1994 | Larabell et al. | 439/157 X |
| 5,313,595 | 5/1994 | Lewis et al. | 395/325 |
| 5,527,996 | 6/1996 | Ham | 174/113 R X |
| 5,576,972 | 11/1996 | Harrison | 364/516 X |

FOREIGN PATENT DOCUMENTS 3-138813  6/1991  Japan ...................... 174/117 F

OTHER PUBLICATIONS

"SCS1-2 Working Draft Proposal"–Draft prepared by American National Standard for Information System, Aug. 22, 1989.

"AHA–1540CF/1542CF, High Performance Bus Master ISA to SCSI Host Adapter with SCSISelect™, Installation Guide", Adaptec, Inc., 1993.

"AT&T 3600 Quadratic SCSI Adapter Feature Description and Installation, Issue 1", AT&T, 1993.

Primary Examiner—Kristine L. Kincaid
Assistant Examiner—Chau N. Nguyen
Attorney, Agent, or Firm—Merchant, Gould, Smith, Edell, Welter and Schmidt

[57] ABSTRACT

A cable assembly for efficiently connecting together SCSI devices and multi-channel adapters. The cable assembly includes a plurality of cables clamped together by a pass-thru bulkhead assembly, so that the cables can pass through the bulkhead of a cabinet to a multi-channel adapter mounted inside the cabinet. The cables electrically connect to the multi-channel adapter using low profile connectors to maximize the number of connectors that can couple to the adapter and to minimize the amount of clearance required between adapters in the cabinet.

24 Claims, 4 Drawing Sheets

CABLE ASSEMBLY

CROSS-REFERENCE TO RELATED APPLICATION

This application is related to application Ser. No. 08/580, 183 entitled "CABLE CONNECTOR GENDER CHANGER," filed on same date herewith, by Steve Herman, and assigned to the assignee of this application, which application is incorporated by reference herein.

BACKGROUND OF THE INVENTION

1. Field of the Invention

The present invention generally relates to a cable assembly, and more particularly, to a cable assembly for forming SCSI buses that can be efficiently connected to SCSI adapter boards.

2. Description of Related Art

The Small Computer System Interface (SCSI) bus is an industry-standard and ANSI-standard specification for electrical busses used for computers and their peripheral devices. Information regarding SCSI bus standards may be found in numerous publications, including those from the American National Standards Institute.

A SCSI bus is normally used for communications between computers and peripheral devices, among multiple peripheral devices, and among multiple computers. Typically, a computer has a SCSI adapter or controller attached thereto that directly couples the computer to the SCSI bus and that performs lower levels of SCSI protocol. The adapter normally acts as an "initiator" of an I/O request to another device known as a "target." Targets may comprise adapters or controllers for other computers or peripheral devices coupled to the SCSI bus. A plurality of SCSI devices (whether they are initiators or targets) may be daisy-chained together. A SCSI bus is shared when there are multiple initiators thereon, and is unshared when there is only a single initiator thereon. Further, both ends of the SCSI bus are terminated to prevent noise and to maintain the SCSI bus in a known state.

Generally, a SCSI bus cable comprises a plurality of separately insulated conductors that twist around each other inside grounding shield and insulating layers to form a substantially rounded cross-section. The "narrow" SCSI bus standard uses cables having fifty conductors, while the "wide" SCSI bus standard uses cables having sixty-eight conductors.

The combination of separate conductors, grounding shield layers, and insulating layers makes SCSI cables thick and cumbersome. Standard connectors used for SCSI cables are also thick and cumbersome, because they need to provide pins for fifty or sixty-eight conductors, maintain grounding, and provide protection against electro-magnetic interference (EMI).

Because SCSI cables and connectors are thick and cumbersome, they often create packaging difficulties. For example, when several SCSI connectors are connected to one or more adapters in a single cabinet, the connectors take up a lot of space on the bulkhead of the cabinet, and the cables tangle up with each other easily.

Thus, there is a need in the art for improved packaging of SCSI cables and improved connectors used with SCSI cables.

SUMMARY OF THE INVENTION

To overcome the limitations described above, and to overcome other limitations that will become apparent upon reading and understanding the present specification, the present invention discloses a cable assembly for efficiently connecting together SCSI devices and multi-channel adapters. The cable assembly comprises a plurality of cables clamped together by a pass-thru bulkhead assembly, so that they can pass through the bulkhead of a cabinet to a multi-channel adapter inside the cabinet. The cables electrically connect to the multi-channel adapter using low profile connectors to maximize the number of connectors that can couple to the adapter and to minimize the amount of clearance required between adapters in the cabinet.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
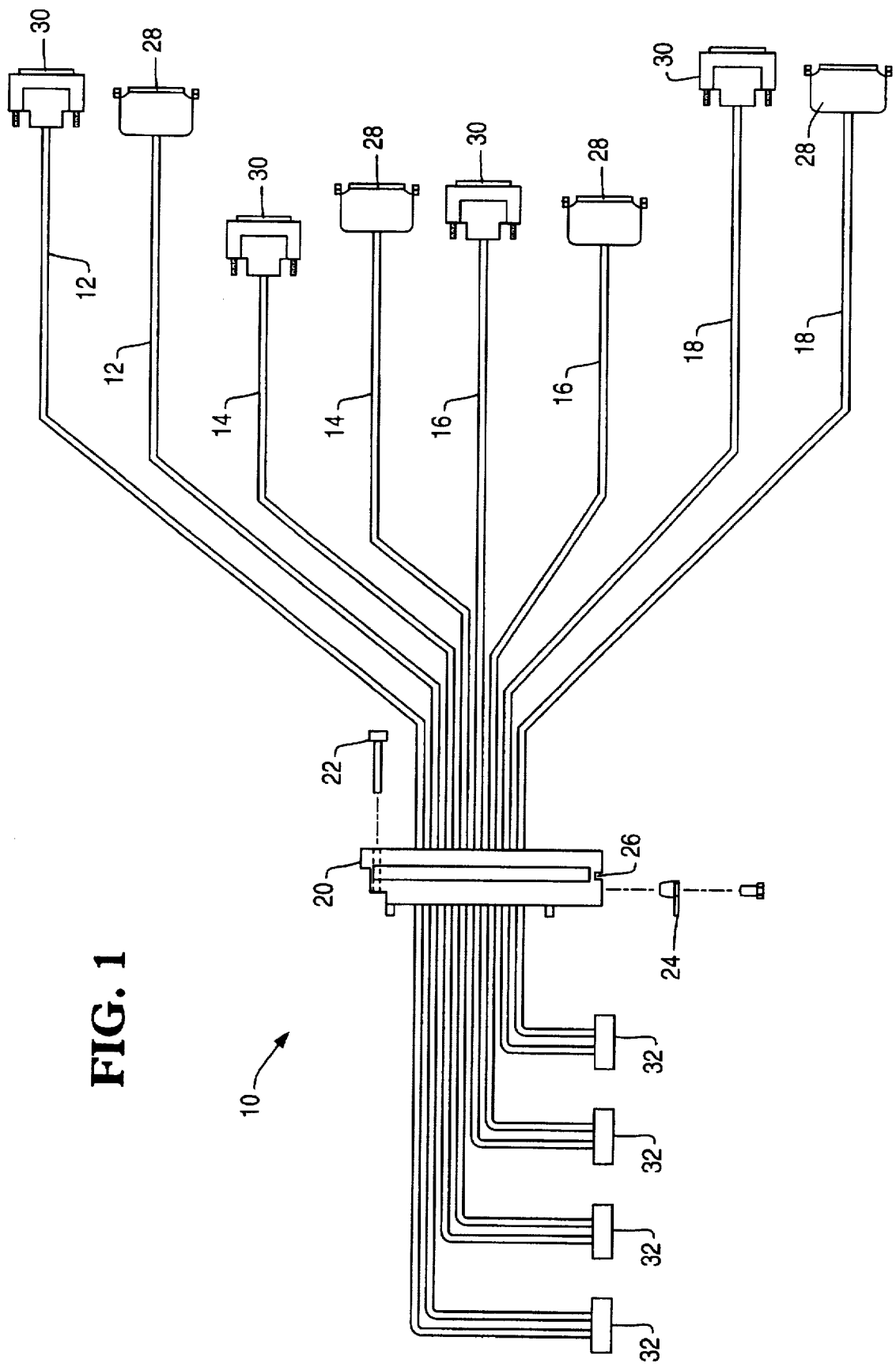
FIG. 1 is plan view illustrating the cable assembly of the present invention.

FIG. 1 is plan view illustrating the cable assembly 10 of the present invention. The cable assembly 10 comprises a plurality of cables 12, 14, 16, and 18 coupled or clamped together by a pass-thru bulkhead assembly 20. Each of the cables may comprise a separate shared or unshared SCSI bus, depending on the associated configuration of SCSI adapters and devices coupled thereto.

The pass-thru bulkhead assembly 20 also includes a mounting thumbscrew 22, a board retainer thumbscrew 24, and a pass-thru bulkhead notch 26. The mounting thumbscrew 22 and board retainer thumbscrew 24 cooperate to clamp the pass-thru bulkhead assembly 20 to a cabinet bulkhead containing adapters connected to the cables 12, 14, 16 and 18. The pass-thru bulkhead notch 26 maintains the pass-thru bulkhead assembly 20 in a tight, electrically grounding fit with the cabinet bulkhead.

As a result, the pass-thru bulkhead assembly 20 provides strain relief for the cables 12, 14, 16, and 18. Because cables 12, 14, 16, and 18 of the cable assembly 10 are coupled or clamped together at the pass-thru bulkhead assembly 20, they are more manageable, easily identifiable with a slot, and less likely to become tangled with each other or with other cables.

Each of the cables 12, 14, 16, and 18 in the cable assembly 10 may use any combination of three types of connectors: standard SCSI male connectors 28, standard SCSI female connectors 30, and non-standard SCSI male or female "ribbon cable" connectors 32. All of the connectors 28, 30, and 32 are electrically compatible with the SCSI bus standard. In the illustrated embodiment, each cable 12, 14, 16, and 18 connects at one end to a male connector 28, and at the other end to a female connector 30. Further, each of cables 12, 14, 16, and 18 has a ribbon cable connector 32 at its midpoint.

The male connectors 28 and female connectors 30 electrically interconnect to each of the individually insulated conductors inside the cables 12, 14, 16, and 18. The ribbon cable connectors 32 also electrically interconnect to each of the individually insulated conductors inside the cables 12, 14, 16, and 18. The male connectors 28, female connectors 30, and ribbon cable connectors 32 all electrically connect the cables 12, 14, 16, and 18 to one or more SCSI adapters or devices.

Figure 2:
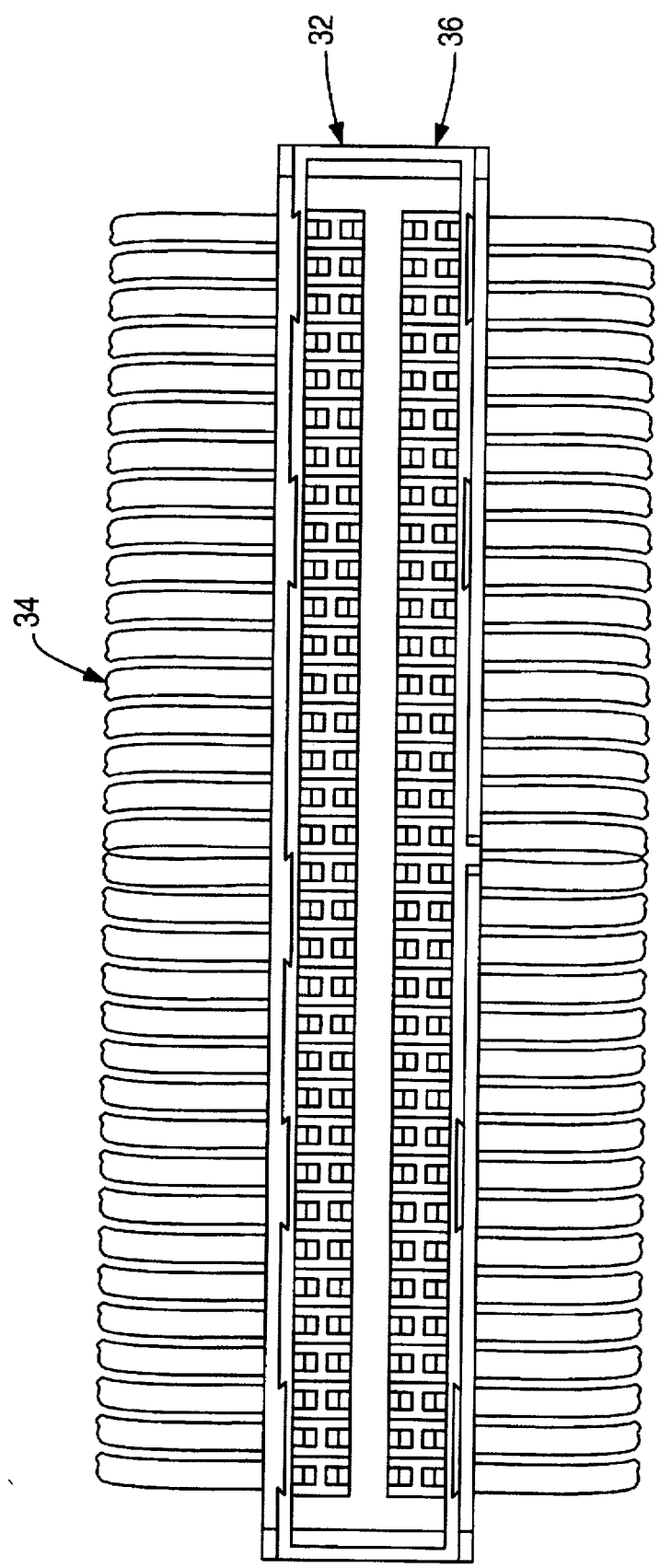
FIG. 2 is a plan view further illustrating the ribbon cable connector used at a midpoint of the cable assembly according to the present invention.

FIG. 2 is a plan view further illustrating the non-standard ribbon cable connector 32 used in the cable assembly 10 according to the present invention. At a mid-point in the cable, the conductors 34 are separated or "combed" out to resemble, in essence, a standard ribbon cable for use with the ribbon cable connector 32. The ribbon cable connector 32 taps into, but does not terminate, the conductors 34 and provides pin receptacles 36 for coupling to another connector (not shown).

In one alternative embodiment, the conductors 34 are laminated after being combed out and prior to cutting through the insulation on the conductors 34 so that the ribbon cable connector 32 can make contact with the conductors 34. However, this lamination step may add too much thickness to the insulation already present on each conductor 34, making it difficult to achieve a proper contact with the pin receptacles 36 in the ribbon cable connector 32. Therefore, in a preferred embodiment, no lamination is applied to conductors 34.

Figure 3A:
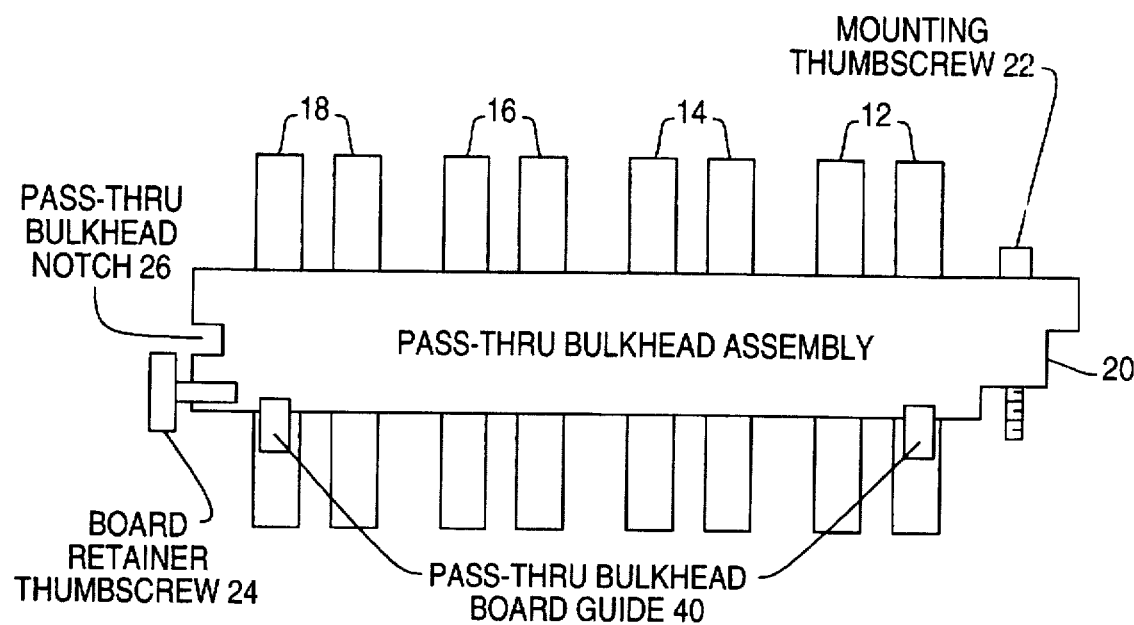
FIG. 3A is a plan view further illustrating the pass-thru bulkhead assembly according to the present invention.
Figure 3B:
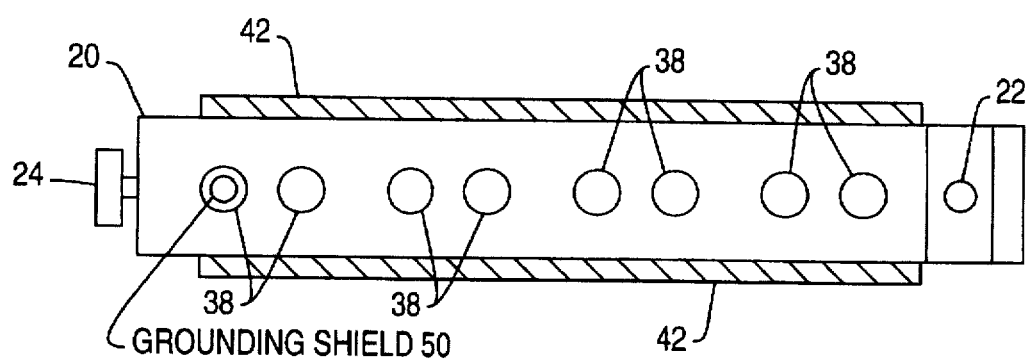
FIG. 3B is a top view further illustrating the pass-thru bulkhead assembly according to the present invention.

FIG. 3A is a plan view further illustrating the pass-thru bulkhead assembly 20 according to the present invention, and FIG. 3B is a top view further illustrating the pass-thru bulkhead assembly 20 according to the present invention. The pass-thru bulkhead assembly 20 is typically made of a conductive material, and has eight guides 38 providing apertures for passing two ends each of four cables 12, 14, 16, and 18 through the assembly 20, so that each of the four cables 12, 14, 16, and 18 passes through the pass-thru bulkhead assembly 20 twice. Of course, those skilled in the art will recognize that a greater or lesser number of guides 38 may be used instead. In the preferred embodiment, any empty guides 38 in the assembly 20 could be plugged up with EMI shielding material.

The pass-thru bulkhead assembly 20 may also include a mounting thumbscrew 22, a board retainer thumbscrew 24, a pass-thru bulkhead notch 26, a pass-thru bulkhead board guide 40, and pass-thru bulkhead cushions 42 on either side thereof. The board retainer thumbscrew 24 and mounting thumbscrew 22 cooperate to clamp the pass-thru bulkhead assembly 20 to a cabinet bulkhead. The pass-thru bulkhead notch 26 maintains the pass-thru bulkhead assembly 20 in a tight fit with the cabinet bulkhead. The pass-thru bulkhead board guide 40 aligns the pass-thru bulkhead assembly 20 with a corresponding opening on the cabinet bulkhead. The pass-thru bulkhead cushions 42 allow easy insertion of the assembly into an opening in the cabinet bulkhead, while maintaining a snug fit as well.

As a result, the pass-thru bulkhead assembly 20 provides strain relief for the cables 12, 14, 16, and 18 by tightly coupling or clamping the cables 12, 14, 16, and 18 to the cabinet bulkhead. Further, pulling on the cables 12, 14, 16, and 18 will not place any strain on their internal portions.

The pass-thru bulkhead assembly 20 also provides EMI grounding. As described above, underneath the insulation around each of cables 12, 14, 16, and 18, a conductive grounding shield layer 50 surrounds the conductors of the cables. The pass-thru bulkhead assembly 20 penetrates the insulation around the cables to electrically contact this grounding shield. Because the pass-thru bulkhead assembly 20 is itself conductive, it electrically connects the grounding shield layer to the rest of the bulkhead, and provides EMI shielding from the components inside the bulkhead.

Figure 4:
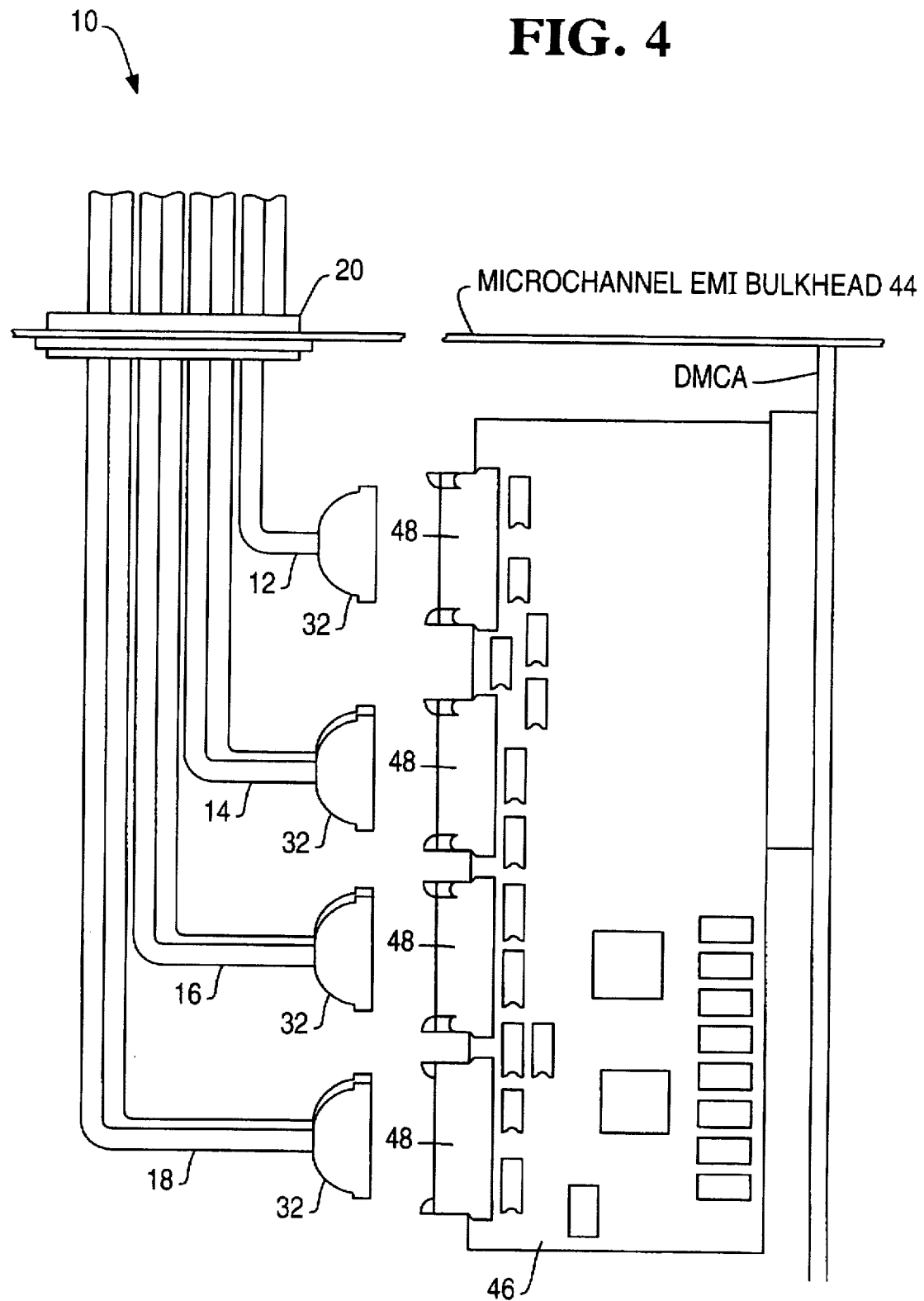
FIG. 4 is a top view illustrating the mounting of the cable assembly according to the present invention.

FIG. 4 is a top view illustrating the mounting of the cable assembly 10 according to the present invention. The pass-thru bulkhead assembly 20 is mounted in an opening in the cabinet bulkhead 44. Cables 12, 14, 16, and 18 pass through guides 38 respectively, in the pass-thru bulkhead assembly 20 and thus are securely attached to the cabinet bulkhead 44. The cabinet bulkhead 44 provides EMI shielding around adapter boards 46 and other components within the cabinet. The pass-thru bulkhead assembly 20 maintains this EMI shielding around the cables 12, 14, 16, and 18 passing through the cabinet bulkhead 44.

The cables 12, 14, 16, and 18 enter the cabinet bulkhead 44 through the pass-thru bulkhead assembly 20 to the left of an adapter board 46 and the low-profile ribbon cable connectors 32 are bent to approach edge connectors 48 on the adapter board 46. Alternatively, the cables 12, 14, 16, and 18 can be inserted through the cabinet bulkhead 44 opening containing the pass-thru bulkhead assembly 20 located above the adapter board 46. Both arrangements allow the placement of the long side of the adapter board 46 away from, and perpendicular to, the cabinet bulkhead 44, thus achieving significant space-savings.

Although the ribbon cable connectors 32 conform electrically to the SCSI bus standard, these connectors 32 are not as wide or as bulky as standard SCSI connectors. The smaller size of the ribbon cable connectors 32 allows them to be coupled to four edge connectors 48 on the same side of a single multi-channel adapter board 46, rather than one or two edge connectors as found in the prior art. Because the ribbon cable connectors 32 have a lower profile as compared with standard SCSI connectors, other adapter boards may be mounted in close proximity to the adapter board 46.

In the preferred embodiment, the adapter board 46 is a MCA Q720 adapter board manufactured by AT&T Global Information Solutions Company. A more complete description of the Q720 adapter board 46 is provided in the publication "AT&T Quadratic SCSI Adapter Feature Description and Installation," which publication is incorporated by reference herein. Of course, those skilled in the art will recognize that other adapter boards may also be used with the present invention.

The Q720 adapter board 46 uses the wide (68 conductor) SCSI standard and provides four SCSI bus connections via the four edge connectors 48. The Q720 adapter board 46 supports up to 16 devices on each of the four SCSI busses coupled to the edge connectors 48. In addition, a number of Q720 adapter boards 46, or other devices, may be plugged into slots inside the cabinet. The adapter boards 46 are often mounted edge-wise in the slots and the slots extend flush from one side to the other side of the cabinet.

In the prior art, a four channel adapter board 46 would require four openings along the cabinet bulkhead 44 for four SCSI cables connected thereto. Each of the four openings in the cabinet bulkhead would have to be large enough to accommodate four standard SCSI bus cables and their connectors. When a single cabinet uses several adapter boards, the cumulative installation of the SCSI cables and connectors requires a large amount of space in the cabinet. Until the advent of the present invention, however, it has been difficult to manage and package such cables in an efficient manner.

This concludes the description of the preferred embodiment of the invention. In summary, a new and improved cable assembly is disclosed for efficiently connecting together SCSI devices and multi-channel adapters. The cable assembly comprises a plurality of cables clamped together by a pass-thru bulkhead assembly, so that the cables can pass through the bulkhead of a cabinet to a multi-channel adapter mounted inside the cabinet. The cables electrically connect to the multi-channel adapter using low profile connectors to maximize the number of connectors that can couple to the adapter and to minimize the amount of clearance required between adapters in the cabinet.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A cable assembly comprising:
   (a) a plurality of cables, each of the cables having a first end, a second end, and a midpoint, and each of the cables comprising a plurality of conductors surrounded by an insulating means, a first connector electrically connected to the conductors at said first end of the cable, a second connector electrically connected to the conductors at said second end of the cable, and a third connector electrically connected to the conductors between the first end and the second end of the cable;
   (b) a pass-thru bulkhead assembly for coupling together the cables, the pass-thru bulkhead assembly further comprising one or more guides for each of the coupled-together cables, each of the guides providing an aperture for the cable to pass therethrough; and
   (c) means for mounting the pass-thru bulkhead assembly in an aperture of a cabinet bulkhead.

2. The cable assembly of claim 1, wherein the first and second connectors are standard SCSI connectors, and the third connector is a ribbon-type connector.

3. The cable assembly of claim 1, wherein the third connector is electrically connected to the conductors of the cable at approximately said midpoint thereof.

4. The cable assembly of claim 1, wherein each of the cables further comprises a grounding shield between the conductors and the insulating means.

5. The cable assembly of claim 4, wherein the pass-thru bulkhead assembly makes electrical contact with the grounding shields of the cables to provide electromagnetic interference grounding.

6. The cable assembly of claim 1, wherein the cables are adapted for connecting together one or more SCSI devices with a multi-channel adapter.

7. The cable assembly of claim 6, wherein the cables electrically connect to the multi-channel adapter using low profile connectors to maximize the number of connectors that can fit on the adapter and to minimize the amount of clearance required between adapters in the cabinet.

8. The cable assembly of claim 1, wherein the means for mounting comprises a mounting thumbscrew on the pass-thru bulkhead assembly.

9. The cable assembly of claim 8, wherein the means for mounting further comprises a board retainer thumbscrew on the pass-thru bulkhead assembly that cooperates with the mounting thumbscrew to clamp the pass-thru bulkhead assembly to said cabinet bulkhead.

10. The cable assembly of claim 8, wherein the means for mounting further comprises a pass-thru bulkhead notch on the pass-thru bulkhead assembly that maintains the pass-thru bulkhead assembly in a tight fit with the cabinet bulkhead.

11. The cable assembly of claim 8, wherein the means for mounting further comprises a pass-thru bulkhead board guide on the pass-thru bulkhead assembly that aligns the pass-thru bulkhead assembly with a corresponding opening on the cabinet bulkhead.

12. The cable assembly of claim 1, wherein the pass-thru bulkhead assembly includes one or more pass-thru bulkhead cushions that allow easy insertion of the assembly into an opening in the cabinet bulkhead while maintaining a snug fit.

13. A cable assembly comprising:
   (a) a plurality of cables, each of the cables comprising a plurality of conductors surrounded by an insulating means, a first connector electrically connected to the conductors at a first end of the cable, a second connector electrically connected to the conductors at a second end of the cable, and a third connector electrically connected to the conductors at a midpoint between the first end and the second end of the cable;
   (b) a pass-thru assembly for coupling together the cables, wherein the pass-thru assembly further comprises one or more guides for each of the coupled-together cables, each of the guides provides an aperture for the cable to pass therethrough,
   (c) means for mounting the pass-thru assembly in an aperture in a wall of a cabinet.

14. The cable assembly of claim 13, wherein the first and second connectors are standard SCSI connectors, and the third connector is a ribbon-type connector.

15. The cable assembly of claim 13, wherein each of the cables further comprises a grounding shield between the conductors and the insulating means.

16. The cable assembly of claim 15, wherein the pass-thru assembly makes electrical contact with the grounding shields of the cables to provide electromagnetic interference grounding.

17. The cable assembly of claim 13, wherein the cables are adapted for connecting together one or more SCSI devices with a multi-channel adapter.

18. The cable assembly of claim 17, wherein the cabinet contains the multi-channel adapter.

19. The cable assembly of claim 17, wherein the cables electrically connect to the multi-channel adapter using low profile connectors to maximize the number of connectors that can fit on the adapter and to minimize the amount of clearance required between adapters in the cabinet.

20. A cable assembly comprising:
   (a) a plurality of cables for connecting together a plurality of devices with a multi-channel adapter, each of the cables comprising a plurality of conductors, a first connector electrically connected to the conductors at a first end of the cable, a second connector electrically connected to the conductors at a second end of the cable, and a third connector electrically connected to the conductors of the cable at approximately a midpoint thereof; and
   (b) a pass-thru bulkhead assembly for clamping together the cables, wherein the pass-thru bulkhead assembly mounts in a bulkhead of a cabinet containing the multi-channel adapter, the pass-thru bulkhead assembly further comprising one or more guides for each of the clamped-together cables, each of the guides providing an aperture for the cable to pass therethrough.

21. The cable assembly of claim 20, wherein the first and second connectors are standard SCSI connectors, and the third connector is a ribbon-type connector.

22. The cable assembly of claim 20, wherein each of the cables further comprises a grounding shield between the conductors and the insulating means.

23. The cable assembly of claim 22, wherein the pass-thru bulkhead assembly makes electrical contact with the grounding shields of the cables to provide electromagnetic interference grounding.

24. The cable assembly of claim 20, wherein the cables electrically connect to the multi-channel adapter using low profile connectors to maximize the number of connectors that can fit on the adapter and to minimize the amount of clearance required between adapters in the cabinet.

* * * * *